(12) United States Patent
Sawada

(10) Patent No.: US 9,978,536 B2
(45) Date of Patent: May 22, 2018

(54) METHOD OF MANUFACTURING ELECTRONIC COMPONENT AND ELECTRONIC-COMPONENT MANUFACTURING APPARATUS

(71) Applicant: Murata Manufacturing Co., Ltd., Nagaokakyo-shi, Kyoto-fu (JP)

(72) Inventor: Takashi Sawada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 378 days.

(21) Appl. No.: 14/604,945

(22) Filed: Jan. 26, 2015

(65) Prior Publication Data

US 2015/0221453 A1    Aug. 6, 2015

(30) Foreign Application Priority Data

Jan. 31, 2014   (JP) ................................. 2014-016447
Dec. 18, 2014   (JP) ................................. 2014-255818

(51) Int. Cl.
| | |
|---|---|
| *B05D 5/12* | (2006.01) |
| *H01G 13/00* | (2013.01) |
| *H01G 4/12* | (2006.01) |
| *H01G 4/248* | (2006.01) |
| *H01G 4/005* | (2006.01) |

(52) U.S. Cl.
CPC .......... *H01G 13/006* (2013.01); *H01G 4/005* (2013.01); *H01G 4/12* (2013.01); *H01G 4/248* (2013.01)

(58) Field of Classification Search
USPC ......................................................... 427/79
See application file for complete search history.

(56) References Cited

U.S. PATENT DOCUMENTS

| | | |
|---|---|---|
| 2002/0014202 A1 | 2/2002 | Onodera et al. |
| 2008/0180877 A1 | 7/2008 | Togashi et al. |
| 2013/0050897 A1 | 2/2013 | Kim |

(Continued)

FOREIGN PATENT DOCUMENTS

| | | | |
|---|---|---|---|
| JP | 02-016709 | * | 1/1990 |
| JP | 02-16709 A | | 1/1990 |

(Continued)

OTHER PUBLICATIONS

Machine translation of JP 2011-167989.*

(Continued)

*Primary Examiner* — Austin Murata
(74) *Attorney, Agent, or Firm* — Keating & Bennett, LLP

(57) ABSTRACT

Electroconductive paste is applied onto an electronic component body to form an external electrode by supplying the electroconductive paste to a first groove on an outer circumferential surface of a roller to extend along a circumference of the roller, disposing the electronic component body such that a second main surface of the electronic component body and an outer circumferential surface of the roller are opposed to each other while a first edge portion defined by the second main surface and a first end surface of the electronic component body is in the first groove when viewed in plan, and pressing the electronic component body against the outer circumferential surface of the roller so that the first edge portion is located in the first groove in a depth direction of the first groove.

6 Claims, 8 Drawing Sheets

(56) References Cited

U.S. PATENT DOCUMENTS

2014/0104750 A1\* 4/2014 Ahn .................. H01G 4/30
                                                            361/306.3
2014/0312991 A1\* 10/2014 Tan .................. H01G 4/30
                                                            333/184

FOREIGN PATENT DOCUMENTS

| JP | 05-92406 A | 4/1993 |
| --- | --- | --- |
| JP | 08-162364 A | 6/1996 |
| JP | 2011-167989 \* | 6/2001 |
| JP | 2001-345240 A | 12/2001 |
| JP | 2005-19927 A | 1/2005 |
| JP | 2008-053544 A | 3/2008 |
| JP | 2008-187036 A | 8/2008 |
| JP | 2011-097091 A | 5/2011 |
| JP | 2013-055320 A | 3/2013 |

OTHER PUBLICATIONS

Machine translation for Hiroyoshi (JP 02-016709).\*
Official Communication issued in corresponding Korean Patent Application No. 10-2015-0014415, dated Feb. 22, 2016.
Official Communication issued in Japanese Patent Application No. 2014-255818, dated May 2, 2017.

\* cited by examiner

METHOD OF MANUFACTURING ELECTRONIC COMPONENT AND ELECTRONIC-COMPONENT MANUFACTURING APPARATUS

BACKGROUND OF THE INVENTION

1. Field of the Invention

The present invention relates to a method of manufacturing an electronic component and an electronic-component manufacturing apparatus.

2. Description of the Related Art

Electronic components such as monolithic ceramic capacitors have been widely used. For example, Japanese Unexamined Patent Application Publication No. 2013-55320 describes a monolithic capacitor that includes an external electrode disposed over a first main surface and a first end surface. In the monolithic ceramic capacitor described in Japanese Unexamined Patent Application Publication No. 2013-55320, the external electrode is disposed on a portion of the first end surface and does not extend up to a second main surface.

The form of installing a monolithic capacitor including an external electrode such as the one described in Japanese Unexamined Patent Application Publication No. 2013-55320 is subject to change in accordance with the size of a portion of the external electrode disposed on the end surface. Thus, the demand for forming external electrodes having a highly accurate shape has been growing.

SUMMARY OF THE INVENTION

Preferred embodiments of the present invention provide a method of manufacturing an electronic component that includes an external electrode having a highly accurate shape.

A method of manufacturing an electronic component according to a preferred embodiment of the present invention relates to a method of manufacturing an electronic component including an electronic component body and a first external electrode, the electronic component body including first and second main surfaces each extending in a length direction and a width direction, first and second side surfaces each extending in the length direction and a thickness direction, and first and second end surfaces each extending in the width direction and the thickness direction, and the first external electrode extending across the second main surface and the first end surface. The method includes an application step of applying electroconductive paste that forms the first external electrode onto the electronic component body. In the application step, the electroconductive paste is applied onto the electronic component body by supplying the electroconductive paste to a first groove formed on an outer circumferential surface of a roller so as to extend along a circumference of the roller, the outer circumferential surface being made of an elastic material, disposing the electronic component body such that the second main surface of the electronic component body and an outer circumferential surface of the roller are opposed to each other while a first edge portion defined by the second main surface and the first end surface of the electronic component body is located in the first groove when viewed in plan, and pressing the electronic component body against the outer circumferential surface of the roller so that the first edge portion is located in the first groove in a depth direction of the first groove.

A method according to a preferred embodiment of the present invention preferably further includes a step of arranging a plurality of the electronic components so that the second main surfaces of the electronic component bodies of the electronic components are oriented in one direction and a step of inserting the arranged electronic components into a carrier tape prior to the application step.

In a method according to a preferred embodiment of the present invention, the electronic component or each of the electronic components preferably further includes a second external electrode extending across the second main surface and the second end surface. In the application step, the electroconductive paste is preferably applied onto the electronic component body by supplying the electroconductive paste to the first groove and a second groove formed on the outer circumferential surface of the roller so as to extend along the circumference of the roller, disposing the electronic component body such that the second main surface of the electronic component body and the outer circumferential surface of the roller are opposed to each other while the first edge portion is located in the first groove and a second edge portion defined by the second main surface and the second end surface of the electronic component body is located in the second groove when viewed in plan, and pressing the electronic component body against the outer circumferential surface of the roller so that the first edge portion is located in the first groove in the depth direction and the second edge portion is located in the second groove in the depth direction.

In a method according to a preferred embodiment of the present invention, the electronic component or each of the electronic components preferably further include a third external electrode disposed on the second main surface at a position between the first external electrode and the second external electrode, the third external electrode extending across the first side surface, the second main surface, and the second side surface. In the application step, the electroconductive paste is preferably applied onto the electronic component body by supplying the electroconductive paste to the first groove, the second groove, and a third groove, formed between the first groove and the second groove on the outer circumferential surface of the roller so as to extend along the circumference of the roller, disposing the electronic component body such that the second main surface and the outer circumferential surface of the roller are opposed to each other while the first edge portion is located in the first groove, the second edge portion is located in the second groove, and the third groove is opposed to the second main surface when viewed in plan, and pressing the electronic component body against the outer circumferential surface of the roller so that the first edge portion is located in the first groove in the depth direction and the second edge portion is located in the second groove in the depth direction.

In a method according to preferred embodiments of the present invention, the third groove preferably has a length extending in the length direction that is longer than lengths of the first groove and the second groove extending in the length direction.

An electronic-component manufacturing apparatus according to another preferred embodiment of the present invention relates to an apparatus that manufactures an electronic component including an electronic component body and a first external electrode, the electronic component body including first and second main surfaces each extending in a length direction and a width direction, first and second side surfaces each extending in the length direction and a thickness direction, and first and second end surfaces each extending in the width direction and the thickness direction, and the first external electrode extending across the second main surface and the first end surface. The apparatus includes a roller and an electroconductive-paste supplying unit. The roller includes an outer circumferential surface made of an elastic material and on which a first groove extends along a circumference of the roller. The electroconductive-paste supplying unit is configured to provide electroconductive paste to the first groove to form the first external electrode. In the apparatus, the electronic component body is disposed such that the second main surface of the electronic component body and an outer circumferential surface of the roller are opposed to each other while a first edge portion defined by the second main surface and the first end surface of the electronic component body is located in the first groove when viewed in plan, and the electronic component body is pressed against the outer circumferential surface of the roller so that the first edge portion is located in the first groove in a depth direction of the first groove to apply the electroconductive paste onto the electronic component body.

In an apparatus according to a preferred embodiment of the present invention, the electronic component may further include a second external electrode extending across the second main surface and the second end surface. The roller may further include a second groove arranged on the outer circumferential surface so as to extend along the circumference of the roller and to which the electroconductive paste is supplied by the electroconductive-paste supplying unit. The electronic component body is preferably disposed such that the second main surface of the electronic component body and the outer circumferential surface of the roller are opposed to each other while the first edge portion is located in the first groove and a second edge portion defined by the second main surface and the second end surface of the electronic component body is located in the second groove when viewed in plan, and the electronic component body is preferably pressed against the outer circumferential surface of the roller so that the first edge portion is located in the first groove in the depth direction and the second edge portion is located in the second groove in the depth direction to apply the electroconductive paste onto the electronic component body.

In an apparatus according to a preferred embodiment of the present invention, the electronic component preferably further includes a third external electrode disposed on the second main surface at a position between the first external electrode and the second external electrode so as to extend between the second main surface and the first and second side surfaces. The roller preferably further includes a third groove formed on the outer circumferential surface at a position between the first groove and the second groove so as to extend along the circumference of the roller and to which the electroconductive paste is supplied by the electroconductive-paste supplying unit. The electronic component body is preferably disposed such that the second main surface of the electronic component body and the outer circumferential surface of the roller are opposed to each other while the first edge portion is located in the first groove, the second edge portion is located in the second groove, and the third groove and the second main surface are opposed to each other when viewed in plan, and the electronic component body is preferably pressed against the outer circumferential surface of the roller so that the first edge portion is located in the first groove in the depth direction and the second edge portion is located in the second groove in the depth direction to apply the electroconductive paste onto the electronic component body.

An apparatus according to a preferred embodiment of the present invention preferably further includes a transportation mechanism that transports a carrier tape in a first direction, the carrier tape including a plurality of insertion openings, into each of which the electronic component body is inserted in the thickness direction, arranged in the length direction and a counterpart roller opposed to the roller. The transportation mechanism preferably transports the carrier tape such that the electronic component body inserted into each of the insertion openings of the carrier tape passes through a space between the roller and the counterpart roller.

In an apparatus according to a preferred embodiment of the present invention, the third groove preferably has a length extending in the length direction that is longer than lengths of the first groove and the second groove extending in the length direction.

An apparatus according to a preferred embodiment of the present invention preferably further includes a mechanism that restricts the carrier tape from moving in a direction perpendicular or substantially perpendicular to a direction in which the carrier tape is transported and a mechanism that allows the roller to move in a direction perpendicular or substantially perpendicular to the direction in which the carrier tape is transported.

An apparatus according to a preferred embodiment of the present invention preferably further includes a heating mechanism that heats the electronic component body inserted into each of the insertion openings of the carrier tape before the electronic component body passes through the space between the roller and the counterpart roller.

In an apparatus according to a preferred embodiment of the present invention, the electroconductive paste is preferably supplied to only one of the roller and the counterpart roller.

Various preferred embodiments of the present invention provide a method of manufacturing an electronic component including an external electrode having a highly accurate shape.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
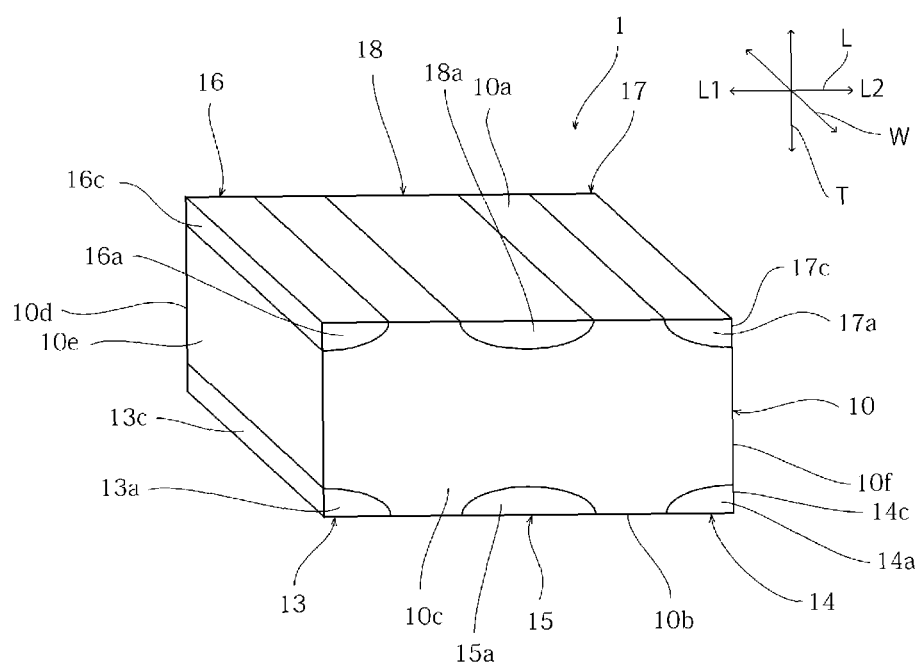
FIG. 1 is a schematic perspective view of an electronic component manufactured by a method according to a preferred embodiment of the present invention.

Hereinbelow, preferred embodiments of the present invention are described. The preferred embodiments described below, however, are mere examples. The present invention is not limited to the preferred embodiments described below.

Throughout the drawings referred to when the preferred embodiments and others are described, components having the same or substantially the same function are denoted by the same reference symbols. The drawings referred to when the preferred embodiments and others are described are schematically drawn. Parameters such as the ratio of dimensions of objects drawn in the drawings may be different from parameters such as the ratio of dimensions of actual objects. Parameters such as the ratio of dimensions of objects may differ between the drawings. Specific parameters such as the ratio of dimensions of objects should be determined in consideration of the following description.

Figure 2:
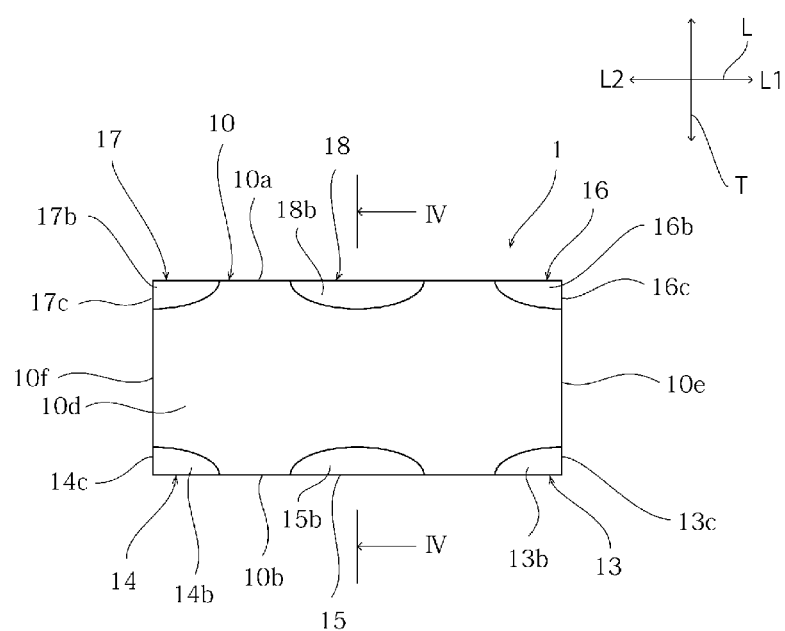
FIG. 2 is a schematic front view of a second side surface of an electronic component manufactured by a method according to a preferred embodiment of the present invention.
Figure 3:
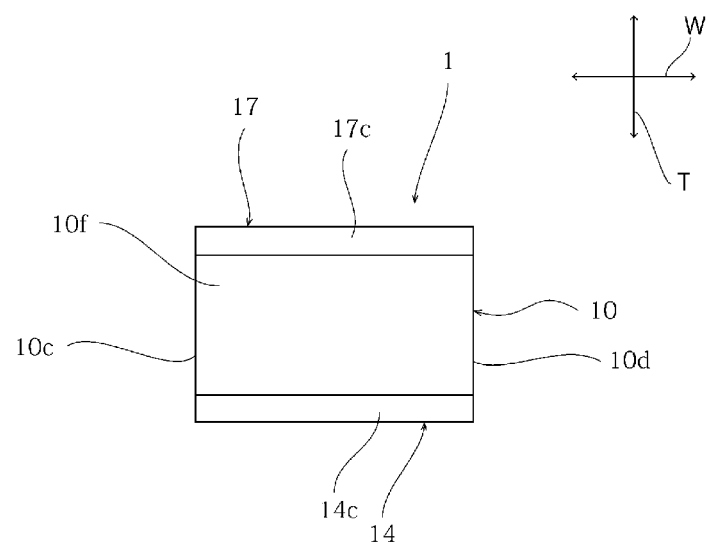
FIG. 3 is a schematic front view of a second end surface of an electronic component manufactured by a method according to a preferred embodiment of the present invention.
Figure 4:
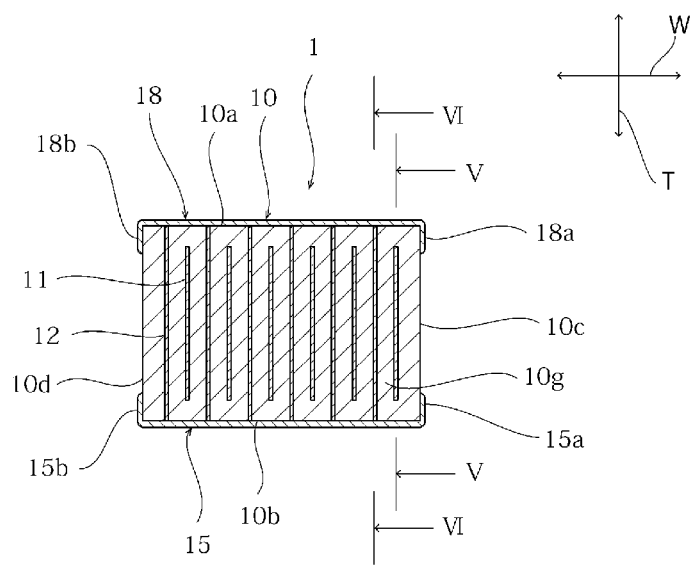
FIG. 4 is a schematic cross-sectional view of the electronic component taken along the line IV-IV of FIG. 2.
Figure 5:
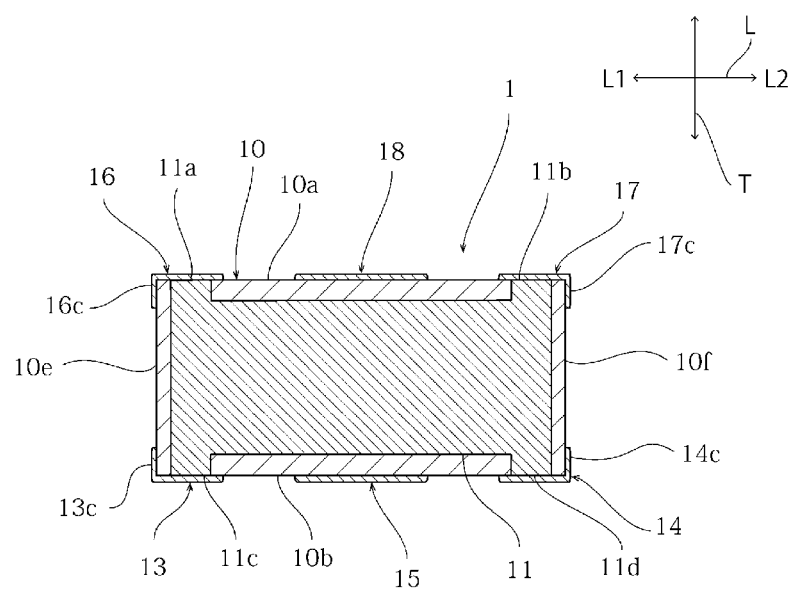
FIG. 5 is a schematic cross-sectional view of the electronic component taken along the line V-V of FIG. 4.
Figure 6:
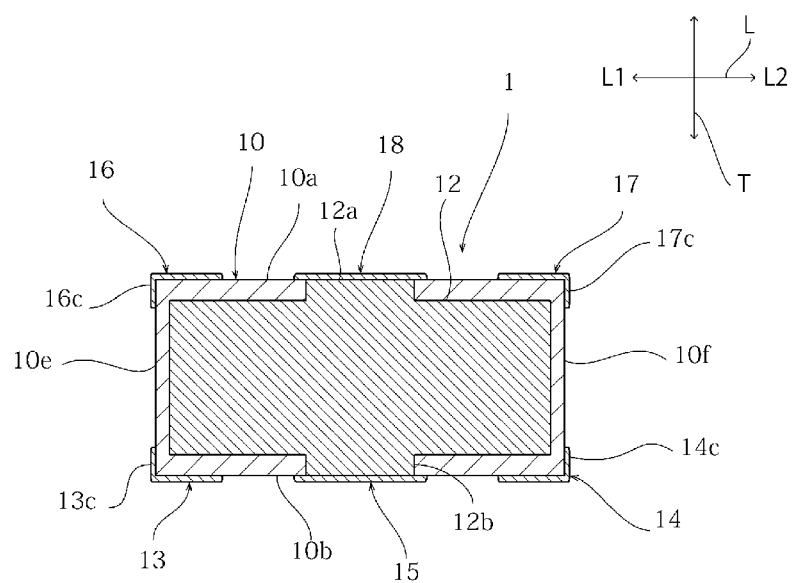
FIG. 6 is a schematic cross-sectional view of the electronic component taken along the line VI-VI of FIG. 4.

FIG. 1 is a schematic perspective view of an electronic component manufactured by a method according to a preferred embodiment of the present invention. FIG. 2 is a schematic front view of a second side surface of an electronic component manufactured by a method according to a preferred embodiment of the present invention. FIG. 3 is a schematic front view of a second end surface of an electronic component manufactured by a method according to a preferred embodiment of the present invention. FIG. 4 is a schematic cross-sectional view of the electronic component taken along the line IV-IV of FIG. 2. FIG. 5 is a schematic cross-sectional view of the electronic component taken along the line V-V of FIG. 4. FIG. 6 is a schematic cross-sectional view of the electronic component taken along the line VI-VI of FIG. 4.

Referring first to FIGS. 1 to 6, the configuration of an electronic component 1 manufactured by a method according to a preferred embodiment is described.

As illustrated in FIGS. 1 to 6, the electronic component 1 includes an electronic component body 10, which preferably has a rectangular or substantially rectangular parallelepiped shape, for example. Corners or edge portions of the electronic component body 10 may be chamfered or rounded. Protrusions and/or recesses may be provided on the main surfaces or side surfaces.

The electronic component body 10 includes first and second main surfaces 10a and 10b, first and second side surfaces 10c and 10d, and first and second end surfaces 10e and 10f. The first and second main surfaces 10a and 10b each extend along the width direction W and the length direction L. The first and second side surfaces 10c and 10d each extend along the width direction W and the thickness direction T. The first and second end surfaces 10e and 10f each extend along the length direction L and the thickness direction T. The length direction L is perpendicular or substantially perpendicular to the width direction W. The thickness direction T is perpendicular or substantially perpendicular to the length direction L and the width direction W.

The dimensions of the electronic component body 10 are not limited to particular dimensions. For example, the thickness of the electronic component body 10 is preferably about 0.8 mm to about 1.0 mm, the length of the electronic component body 10 is preferably about 1.9 mm to about 2.1 mm, and the width of the electronic component body 10 is preferably about 1.15 mm to about 1.35 mm.

The electronic component body 10 is made of ceramics appropriate for the functions of the electronic component 1. Specifically, in the case where the electronic component 1 is a capacitor, the electronic component body 10 may be made of dielectric ceramics. Specific examples of dielectric ceramics include $BaTiO_3$, $CaTiO_3$, $SrTiO_3$, and $CaZrO_3$. In accordance with required characteristics of the electronic component 1, an appropriate secondary ingredient may be added to the electronic component body 10. Examples of secondary ingredients include Mn compounds, Mg compounds, Si compounds, Fe compounds, Cr compounds, Co compounds, Ni compounds, and rare-earth compounds.

In the case where the electronic component 1 is a piezoelectric component, the electronic component body 10 may be made of piezoelectric ceramics. Specific examples of piezoelectric ceramics include ceramics based on lead zirconate titanate (PZT).

In the case, for example, where the electronic component 1 is a thermistor, the electronic component body 10 may be made of semiconductor ceramics. Specific examples of semiconductor ceramics include spinel-based ceramics.

In the case, for example, where the electronic component 1 is an inductor, the electronic component body 10 may be made of magnetic ceramics. Specific examples of magnetic ceramics include ferrite ceramics.

As illustrated in FIG. 4, the electronic component body 10 includes multiple first internal electrodes 11 and multiple second internal electrodes 12, which are disposed inside the electronic component body 10. The first internal electrodes 11 and the second internal electrodes 12 are arranged in the length direction L and the thickness direction T. The first internal electrodes 11 and the second internal electrodes 12 are disposed at intervals so as to alternate in the width direction W. Each first internal electrode 11 and the second internal electrode 12 adjacent to the first internal electrode 11 in the width direction W are opposed to each other in the width direction W across a ceramic portion 10g.

As illustrated in FIG. 5, the first internal electrodes 11 are drawn out from the first and second main surfaces 10a and 10b. Specifically, each first internal electrode 11 includes first to fourth outlet portions 11a to 11d. The first outlet portion 11a is drawn out from a portion of the first main surface 10a close to a first end surface 10e (or on the L1 side in FIG. 5) in the length direction L. The second outlet portion 11b is drawn out from a portion of the first main surface 10a close to a second end surface 10f (or on the L2 side in FIG. 5) in the length direction L. The third outlet portion 11c is drawn out from a portion of the second main surface 10b close to the first end surface 10e (or on the L1 side in FIG. 5) in the length direction L. The fourth outlet portion 11d is drawn out from a portion of the second main surface 10b close to the second end surface 10f (or L2 side in FIG. 5) in the length direction L. The first internal electrodes 11 are separated from the first and second end surfaces 10e and 10f. In other words, the first internal electrodes 11 are not drawn out from the first and second end surfaces 10e and 10f.

As illustrated in FIG. 6, the second internal electrodes 12 are drawn out from the first and second main surfaces 10a and 10b. Specifically, each second internal electrode 12 includes first and second outlet portions 12a and 12b. The first outlet portion 12a is drawn out from a middle portion of the first main surface 10a in the length direction L. The second outlet portion 12b is drawn out from a middle portion of the second main surface 10b in the length direction L. The first and second outlet portions 12a and 12b are arranged so as not to be opposed to the first to fourth outlet portions 11a to 11d in the width direction W. The second internal electrodes 12 are separated from the first and second end surfaces 10e and 10f. In other words, the second internal electrodes 12 are not drawn out from the first and second end surfaces 10e and 10f.

The first and second internal electrodes 11 and 12 may be made of metal such as Ni, Cu, Ag, Pd, Au, and Ag—Pd alloys.

As illustrated in FIGS. 1, 2, 5, and 6, first and second signal terminal electrodes 13 and 14 and a first grounding terminal electrode 15, which are external electrodes, are disposed on the second main surface 10b.

The first signal terminal electrode (first external electrode) 13 is disposed at a portion of the second main surface 10b close to the first end surface 10e (or on the L1 side) in the length direction L. The first signal terminal electrode 13 extends from a first side end to a second side end of the second main surface 10b in the width direction W. The first signal terminal electrode 13 extends across the second main surface 10b, the first and second side surfaces 10c and 10d, and the first end surface 10e. The first signal terminal electrode 13 includes a portion 13a disposed on the first side surface 10c, a portion 13b disposed on the second side surface 10d, and a portion 13c disposed on the first end surface 10e. The first signal terminal electrode 13 does not extend up to the first main surface 10a. Specifically, the portions 13a to 13c do not extend up to the first main surface 10a. Preferably, the portions 13a to 13c have a dimension in the thickness direction T that is shorter than half, more preferably, shorter than or equal to about ⅓ the dimension of the electronic component body 10 in the thickness direction T, for example.

As illustrated in FIG. 5, the first signal terminal electrode 13 is connected to each first internal electrode 11. The first signal terminal electrode 13 covers the third outlet portion 11c of each first internal electrode 11.

As illustrated in FIG. 1, the second signal terminal electrode (second external electrode) 14 is disposed at a portion of the second main surface 10b close to the second end surface 10f (or on the L2 side) in the length direction L. The second signal terminal electrode 14 extends from the first side end to the second side end of the second main surface 10b in the width direction W. The second signal terminal electrode 14 extends across the second main surface 10b, the first and second side surfaces 10c and 10d, and the second end surface 10f. The second signal terminal electrode 14 includes a portion 14a disposed on the first side surface 10c, a portion 14b disposed on the second side surface 10d, and a portion 14c disposed on the second end surface 10f. The second signal terminal electrode 14 does not extend up to the first main surface 10a. Specifically, the portions 14a to 14c do not extend up to the first main surface 10a. Preferably, the portions 14a to 14c have a dimension in the thickness direction T that is shorter than half, more preferably, shorter than or equal to about ⅓ the dimension of the electronic component body 10 in the thickness direction T, for example.

As illustrated in FIG. 5, the second signal terminal electrode 14 is connected to each first internal electrode 11. The second signal terminal electrode 14 covers the fourth outlet portion 11d of each first internal electrode 11.

As illustrated in FIG. 1, the first grounding terminal electrode (third external electrode) 15 is disposed on the second main surface 10b at a position between the first signal terminal electrode 13 and the second signal terminal electrode 14 in the length direction L. The first grounding terminal electrode 15 extends from the first side end to the second side end of the second main surface 10b in the width direction W. The first grounding terminal electrode 15 is separated from the first and second signal terminal electrodes 13 and 14. The first grounding terminal electrode 15 extends across the first side surface 10c, the second main surface 10b, and the second side surface 10d. The first grounding terminal electrode 15 includes a portion 15a disposed on the first side surface 10c and a portion 15b disposed on the second side surface 10d. The first grounding terminal electrode 15 does not extend up to the first main surface 10a. Preferably, the portions 15a and 15b have a dimension in the thickness direction T that is shorter than half, more preferably, shorter than or equal to about ⅓ the dimension of the electronic component body 10 in the thickness direction T, for example.

As illustrated in FIG. 6, the first grounding terminal electrode 15 is connected to each second internal electrode 12. The first grounding terminal electrode 15 covers the second outlet portion 12b of each second internal electrode 12.

As illustrated in FIG. 1, third and fourth signal terminal electrodes 16 and 17 and a second grounding terminal electrode 18 are disposed on the first main surface 10a.

The third signal terminal electrode (fourth external electrode) 16 is disposed at a portion of the first main surface 10a close to the first end surface 10e (or on the L1 side) in the length direction L. The third signal terminal electrode 16 extends from a first side end to a second side end of the first main surface 10a in the width direction W. The third signal terminal electrode 16 extends across the first main surface 10a, the first and second side surfaces 10c and 10d, and the first end surface 10e. The third signal terminal electrode 16 includes a portion 16a disposed on the first side surface 10c, a portion 16b disposed on the second side surface 10d, and a portion 16c disposed on the first end surface 10e. The third signal terminal electrode 16 does not extend up to the second main surface 10b. Specifically, the portions 16a to 16c do not extend up to the second main surface 10b. Preferably, the portions 16a to 16c have a dimension in the thickness direction T that is shorter than half, more preferably, shorter than or equal to about ⅓ the dimension of the electronic component body 10 in the thickness direction T, for example.

As illustrated in FIG. 5, the third signal terminal electrode 16 is connected to each first internal electrode 11. The third signal terminal electrode 16 covers the first outlet portion 11a of each first internal electrode 11.

The fourth signal terminal electrode (fifth external electrode) 17 is disposed at a portion of the first main surface 10a close to the second end surface 10f (or L2 side) in the length direction L. The fourth signal terminal electrode 17 extends from the first side end to the second side end of the first main surface 10a in the width direction W. The fourth signal terminal electrode 17 extends across the first main surface 10a, the first and second side surfaces 10c and 10d, and the second end surface 10f. The fourth signal terminal electrode 17 includes a portion 17a disposed on the first side surface 10c, a portion 17b disposed on the second side surface 10d, and a portion 17c disposed on the second end surface 10f.

The fourth signal terminal electrode 17 does not extend up to the second main surface 10b. Specifically, the portions 17a to 17c do not extend up to the first main surface 10a. Preferably, the portions 17a to 17c have a dimension in the thickness direction T that is shorter than half, more preferably, shorter than or equal to about ⅓ the dimension of the electronic component body 10 in the thickness direction T, for example.

As illustrated in FIG. 5, the fourth signal terminal electrode 17 is connected to each first internal electrode 11. The fourth signal terminal electrode 17 covers the second outlet portion 11b of each first internal electrode 11.

As illustrated in FIG. 1, the second grounding terminal electrode (sixth external electrode) 18 is disposed on the first main surface 10a at a position between the third signal terminal electrode 16 and the fourth signal terminal electrode 17 in the length direction L. The second grounding terminal electrode 18 extends from the first side end to the second side end of the first main surface 10a in the width direction W. The second grounding terminal electrode 18 is separated from the third and fourth signal terminal electrodes 16 and 17. The second grounding terminal electrode 18 extends across the first side surface 10c, the first main surface 10a, and the second side surface 10d. The second grounding terminal electrode 18 includes a portion 18a disposed on the first side surface 10c and a portion 18b disposed on the second side surface 10d. The second grounding terminal electrode 18 does not extend up to the second main surface 10b. Preferably, the portions 18a and 18b have a dimension in the thickness direction T that is shorter than half, more preferably, shorter than or equal to about ⅓ the dimension of the electronic component body 10 in the thickness direction T, for example.

As illustrated in FIG. 6, the second grounding terminal electrode 18 is connected to each second internal electrode 12. The second grounding terminal electrode 18 covers the first outlet portion 12a of each second internal electrode 12.

Each of the first to fourth signal terminal electrodes 13, 14, 16, and 17 and the first and second grounding terminal electrodes 15 and 18 may be made of appropriate metal such as Ni, Cu, Ag, Pd, Au, Sn, Cr, and Ag—Pd alloys.

A non-limiting example of a method of manufacturing the electronic component 1 is described below.

Firstly, an electronic component body 10 is prepared. The electronic component body 10 can be formed in, for example, the following manner. Firstly, a ceramic green sheet is formed by applying ceramic paste onto a carrier tape and drying the paste. Electroconductive paste is then applied onto the ceramic green sheet to form an electroconductive paste layer, which serves as an internal electrode. Subsequently, ceramic green sheets on each of which an electroconductive paste layer is not formed and ceramic green sheets on each of which an electroconductive paste layer has been formed are appropriately stacked one on top of another to form a mother multilayer body. The mother multilayer body is divided into multiple pieces to form raw ceramic bodies. The raw ceramic bodies are then fired to form electronic component bodies 10.

Subsequently, first to fourth signal terminal electrodes 13, 14, 16, and 17 and first and second grounding signal terminal electrodes 15 and 18 are formed on each of the electronic component bodies 10, such that manufacturing of an electronic component 1 is complete. The first to fourth signal terminal electrodes 13, 14, 16, and 17 and the first and second grounding signal terminal electrodes 15 and 18 can be formed by, for example, applying electroconductive paste onto each electronic component body 10 to form an electroconductive paste layer (application step) and then firing the electroconductive paste layer.

The present preferred embodiment describes a case where a fired electronic component body 10 preferably is prepared in advance and the first to fourth signal terminal electrodes 13, 14, 16, and 17 and the first and second grounding signal terminal electrodes 15 and 18 are then formed on the electronic component body 10. The present invention, however, is not limited to this example. For example, an electronic component 1 may be manufactured by forming an electroconductive paste layer on a raw ceramic body to form the first to fourth signal terminal electrodes 13, 14, 16, and 17 and the first and second grounding signal terminal electrodes 15 and 18 and then firing the raw ceramic body and the electroconductive paste layer together at the same time.

Alternatively, a terminal electrode may be a multilayer body including a fired electrode layer and at least one plating layer stacked on the fired electrode layer.

Figure 7:
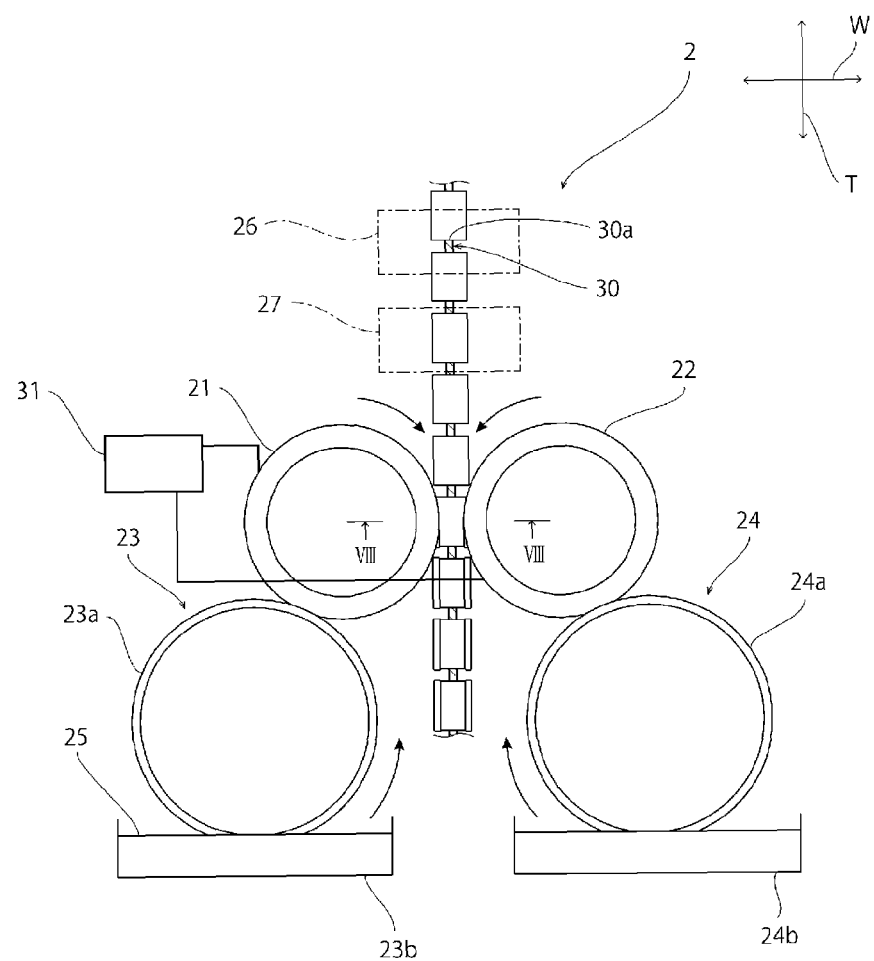
FIG. 7 is a schematic side view of an electronic-component manufacturing apparatus according to a preferred embodiment of the present invention.

In the present preferred embodiment, an electroconductive paste layer for forming the first to fourth signal terminal electrodes 13, 14, 16, and 17 and the first and second grounding signal terminal electrodes 15 and 18 preferably is formed by a manufacturing apparatus 2 illustrated in FIG. 7.

The manufacturing apparatus 2 includes a first roller 21 and a second roller 22. The outer circumferential surfaces of the first and second rollers 21 and 22 are preferably made of elastic materials such as rubber. Thus, the outer circumferential surfaces of the first and second rollers 21 and 22 are deformable in the radial direction.

The first roller 21 and the second roller 22 are opposed to each other with a gap, between them, having a dimension slightly smaller than the dimension of the electronic component body 10 in the thickness direction T. The first roller 21 and the second roller 22 are disposed so as to be rotatable around their own axes.

Figure 8:
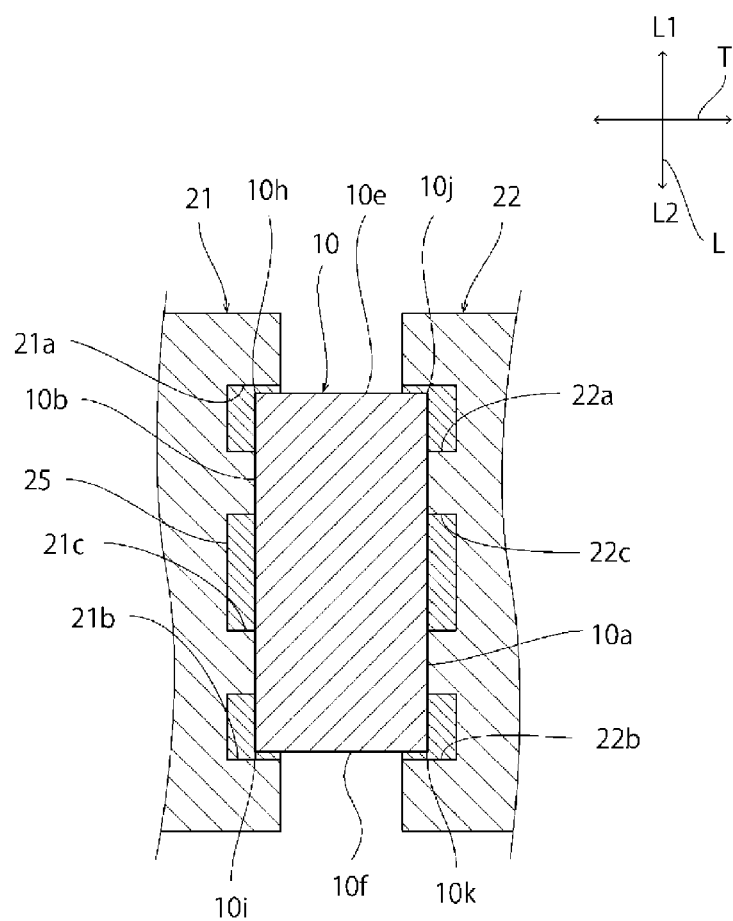
FIG. 8 is a schematic cross-sectional view of the electronic-component manufacturing apparatus taken along the line VIII-VIII of FIG. 7.

As illustrated in FIG. 8, a first groove 21a, a second groove 21b, and a third groove 21c are provided on the outer circumferential surface of the first roller 21. The first to third grooves 21a, 21b, and 21c are annularly configured along the circumference of the first roller 21. The first groove 21a is located the outermost on the L1 side among the first to third grooves 21a, 21b, and 21c. The second groove 21b is located the outermost on the L2 side among the first to third grooves 21a, 21b, and 21c. The third groove 21c is located between the first groove 21a and the second groove 21b. The length of the third groove 21c extending in the length direction L is longer than the length of the first groove 21a extending in the length direction L. The length of the third groove 21c extending in the length direction L is longer than the length of the second groove 21b extending in the length direction L.

The first groove 21a is a groove used to form an electroconductive paste layer serving as the first signal terminal electrode (first external electrode) 13. The second groove 21b is a groove used to form an electroconductive paste layer serving as the second signal terminal electrode (second external electrode) 14. The third groove 21c is a groove used to form an electroconductive paste layer serving as the first grounding terminal electrode (third external electrode) 15.

The first to third grooves 21a, 21b, and 21c of the first roller 21 are supplied with electroconductive paste 25 by a first electroconductive-paste supplying unit 23. The first electroconductive-paste supplying unit 23 includes a roller 23a and an electroconductive paste bath 23b. The roller 23a is disposed such that its outer circumferential surface comes into contact with the outer circumferential surface of the first roller 21. The electroconductive paste bath 23b is configured to allow a lower portion of the roller 23a to be dipped into the electroconductive paste bath 23b. In accordance with the rotation of the first roller 21, the roller 23a rotates and the electroconductive paste 25a is applied to the outer circumferential surface of the roller 23a at a lower portion of the roller 23a. The electroconductive paste 25 applied to the outer circumferential surface of the roller 23a is supplied to the first to third grooves 21a, 21b, and 21c as a result of the roller 23a and the first roller 21 coming into contact with each other.

A fourth groove 22a, a fifth groove 22b, and a sixth groove 22c are provided on the outer circumferential surface of the second roller 22. The fourth to sixth grooves 22a, 22b, and 22c annularly extend along the circumference of the second roller 22. The fourth groove 22a is located the outermost on the L1 side among the fourth to sixth grooves 22a, 22b, and 22c. The fifth groove 22b is located the outermost on the L2 side among the fourth to sixth grooves 22a, 22b, and 22c. The sixth groove 22c is located between the fourth groove 22a and the fifth groove 22b. The length of the sixth groove 22c extending in the length direction L is longer than the length of the fourth groove 22a extending in the length direction L. The length of the sixth groove 22c extending in the length direction L is longer than the length of the fifth groove 22b extending in the length direction L.

The fourth groove 22a is a groove used to form an electroconductive paste layer serving as the third signal terminal electrode (fourth external electrode) 16. The fifth groove 22b is a groove used to form an electroconductive paste layer serving as the fourth signal terminal electrode (fifth external electrode) 17. The sixth groove 22c is a groove used to form an electroconductive paste layer serving as the second grounding terminal electrode (sixth external electrode) 18.

The fourth to sixth grooves 22a, 22b, and 22c of the second roller 22 are supplied with electroconductive paste 25 by a second electroconductive-paste supplying unit 24. The second electroconductive-paste supplying unit 24 includes a roller 24a and an electroconductive paste bath 24b. The roller 24a is disposed such that its outer circumferential surface comes into contact with the outer circumferential surface of the second roller 22. The electroconductive paste bath 24b is configured to allow a lower portion of the roller 24a to be dipped into the electroconductive paste bath 24b. In accordance with the rotation of the second roller 22, the roller 24a rotates and the electroconductive paste 25 is applied to the outer circumferential surface of the roller 24a at a lower portion of the roller 24a. The electroconductive paste 25 applied to the outer circumferential surface of the roller 24a is supplied to the fourth to sixth grooves 22a, 22b, and 22c as a result of the roller 24a and the second roller 22 coming into contact with each other.

In the manufacturing apparatus 2, the electronic component bodies 10 are transported by a carrier tape 30. The carrier tape 30 includes multiple insertion openings 30a arranged at intervals in the longitudinal direction. The electronic component bodies 10 so arranged that surfaces from which the first and second internal electrodes 11 and 12 are exposed are oriented in the same direction are inserted and fixed in the insertion openings 30a. The carrier tape 30 in which the electronic component bodies 10 are inserted and fixed is transported by a transportation mechanism 26 in such a manner as to pass through a space between the first roller 21 and the second roller 22. Each electronic component body 10 is fixed to the carrier tape 30 such that its second main surface 10b comes into contact with the first roller 21 and its first main surface 10a comes into contact with the second roller 22.

The transportation mechanism 26 applies tension to the carrier tape 30 in the thickness direction T. Thus, the carrier tape 30 is prevented from being displaced in the direction perpendicular to the direction in which the carrier tape is transported. The manufacturing apparatus 2 also includes a mechanism 31 that allows the first and second rollers 21 and 22 to move in the direction perpendicular or substantially perpendicular to the direction in which the carrier tape is transported. This structure enables an adjustment of the positional relationship between the electronic component bodies 10 fixed to the carrier tape 30 and the first and second rollers 21 and 22.

Specifically, each electronic component body 10 is placed in a space between the first roller 21 and the second roller 22 in the following manner. When viewed in plan, a first edge portion 10h of the electronic component body 10 defined by the second main surface 10b and the first end surface 10e is located in the first groove 21a, a second edge portion 10i of the electronic component body 10 defined by the second main surface 10b and the second end surface 10f is located over the electronic component body 10, a third edge portion 10j of the electronic component body 10 defined by the first main surface 10a and the first end surface 10e is located in the fourth groove 22a, and a fourth edge portion 10k of the electronic component body 10 defined by the first main surface 10a and the second end surface 10f are located in the fifth groove 22b. The third groove 21c comes into contact with the second main surface 10b. The sixth groove 22c comes into contact with the first main surface 10a.

Here, the first roller 21 and the second roller 22 are opposed to each other with a gap, between them, having a dimension slightly smaller than the dimension of each electronic component body 10 in the thickness direction T. Thus, each electronic component body 10 is pressed against the outer circumferential surfaces of the first and second rollers 21 and 22 such that, in the depth directions of the grooves 21a to 21c and 22a to 22c, the first edge portion 10h is located in the first groove 21a, the second edge portion 10i is located in the second groove 21b, the third edge portion 10j is located in the fourth groove 22a, and the fourth edge portion 10k is located in the fifth groove 22b. Thus, the first to fourth signal terminal electrodes 13, 14, 16, and 17, a portion of which is disposed on the first and second side surfaces 10c and 10d and first or second end surface 10e or 10f, and the first and second grounding terminal electrodes 15 and 18, a portion of which is disposed on the first and second side surfaces 10c and 10d, are formed in the same processing. Thus, the radial distance between a portion of the outer circumferential surface of the first roller 21 that is pressed against the electronic component body 10 and a portion of the outer circumferential surface of the first roller 21 that is not pressed against the electronic component body 10 determines the dimensions in the thickness direction T of the following portions: portions of the first signal terminal electrode 13 respectively disposed on the first and second side surfaces 10c and 10d and the first end surface 10e; portions of the second signal terminal electrode 14 respectively disposed on the first and second side surfaces 10c and 10d and the second end surface 10f; and portions of the first grounding terminal electrode 15 respectively disposed on the first and second side surfaces 10c and 10d. The radial distance between a portion of the outer circumferential surface of the second roller 22 that is pressed against the electronic component body 10 and a portion of the outer circumferential surface of the second roller 22 that is not pressed against the electronic component body 10 determines the dimensions in the thickness direction T of the following portions: portions of the third signal terminal electrode 16 respectively disposed on the first and second side surfaces 10c and 10d and the first end surface 10e; portions of the fourth signal terminal electrode 17 respectively disposed on the first and second side surfaces 10c and 10d and the second end surface 10f; and portions of the second grounding terminal electrode 18 respectively disposed on the first and second side surfaces 10c and 10d. Thus, standardizing the size of the gap between the first roller 21 and the second roller 22 enables a highly accurate control of the dimensions in the thickness direction T of the portions of the terminal electrodes 13 to 18 located on the side surfaces 10c and 10d and the end surfaces 10e and 10f. Thus, each of the terminal electrodes (external electrodes) 13 to 18 is formed so as to have a highly accurate shape. Consequently, the electronic component 1 is capable of being stably mounted on a mount substrate.

Alternatively, changing the size of the gap between the first roller 21 and the second roller 22 preferably facilitates a change of the dimensions in the thickness direction T of the portions of the terminal electrodes 13 to 18 located on the side surfaces 10c and 10d and the end surfaces 10e and 10f.

As illustrated in FIG. 7, the manufacturing apparatus 2 includes a heating mechanism 27 that heats the electronic component bodies 10 inserted in the carrier tape 30 before the electronic component bodies 10 pass through the gap between the first roller 21 and the second roller 22. Thus, the time taken from when the electroconductive paste is applied to when the electroconductive paste is dried and hardens is short. The manufacturing apparatus 2 thus forms the terminal electrodes (external electrodes) 13 to 18 to have a highly accurate shape.

The present preferred embodiment is an example of a structure where an external electrode is provided on each edge portion and an external electrode is provided in a lengthwise middle portion of each of the first and second main surfaces. However, the technology of the present preferred embodiment is also favorably applicable to the manufacture of electronic components having a structure different from the electronic components having the above-described structure. The technology of the present preferred embodiment is favorably applicable to the manufacture of typical electronic components including an external electrode on one of the first and second main surfaces. In this case, the electroconductive paste may be supplied to the groove of only one of the first roller 21 and the second roller 22. In addition, the technology of the present preferred embodiment is favorably applicable to the manufacture of typical electronic components including an external electrode on at least one edge portion. For example, the technology of the present preferred embodiment is favorably applicable to the manufacture of electronic components that each include four external electrodes at only the edge portions and electronic components that each include two external electrodes at only two edge portions on the second main surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A method of manufacturing an electronic component including an electronic component body, a first external electrode, and a second external electrode, the electronic component body including first and second main surfaces each extending in a length direction and a width direction, first and second side surfaces each extending in the length direction and a thickness direction, and first and second end surfaces each extending in the width direction and the thickness direction, the first external electrode extending across the second main surface and the first end surface, and the second external electrode extending across the second main surface and the second end surface, the method comprising:
an application step of applying electroconductive paste that forms the first external electrode and the second external electrode onto the electronic component body; wherein
in the application step, the electroconductive paste is applied onto the electronic component body by:
supplying the electroconductive paste to a first groove and a second groove on an outer circumferential surface of a roller so as to extend along a circumference of the roller, the outer circumferential surface being made of an elastic material;
disposing the electronic component body such that the second main surface of the electronic component body and the outer circumferential surface of the roller are opposed to each other while a first edge portion defined by the second main surface and the first end surface of the electronic component body is located in the first groove and a second edge portion defined by the second main surface and the second end surface of the electronic component body is located in the second groove when viewed in a plan view; and
pressing the electronic component body against the outer circumferential surface of the roller so that the first edge portion is located in the first groove in a depth direction of the first groove and the second edge portion is located in the second groove in the depth direction.

2. The method according to claim 1, further comprising:
a step of arranging a plurality of the electronic components so that the second main surfaces of the electronic component bodies of the electronic components are oriented in one direction; and
a step of inserting the arranged electronic components into a carrier tape prior to the application step.

3. The method according to claim 1, wherein
the electronic component or each of the electronic components further includes a third external electrode disposed on the second main surface at a position between the first external electrode and the second external electrode, the third external electrode extending across the first side surface, the second main surface, and the second side surface; and
in the application step, the electroconductive paste is applied onto the electronic component body by:
supplying the electroconductive paste to a third groove between the first groove and the second groove on the outer circumferential surface of the roller so as to extend along the circumference of the roller;
disposing the electronic component body such that the second main surface and the outer circumferential surface of the roller are opposed to each other while the first edge portion is located in the first groove, the second edge portion is located in the second groove, and the third groove is opposed to the second main surface when viewed in the plan view; and pressing the electronic component body against the outer circumferential surface of the roller so that the first edge portion is located in the first groove in the depth direction and the second edge portion is located in the second groove in the depth direction.

4. The method according to claim 3, wherein the third groove has a length extending in the length direction that is longer than lengths of the first groove and the second groove extending in the length direction.

5. The method according to claim 1, wherein the electronic component is one of a capacitor, a piezoelectric component, a thermistor, and an inductor.

6. The method according to claim 1, wherein the electronic component includes two external electrodes or four external electrodes.

* * * * *